US006549213B1

(12) United States Patent
Sadka

(10) Patent No.: US 6,549,213 B1
(45) Date of Patent: Apr. 15, 2003

(54) COLOR HARMONIZING DEVICE AND METHOD FOR USING THE SAME

(75) Inventor: Dewey G. Sadka, Atlanta, GA (US)

(73) Assignee: Energia, Inc., Atlanta, GA (US)

( * ) Notice: Subject to any disclaimer, the term of this patent is extended or adjusted under 35 U.S.C. 154(b) by 0 days.

(21) Appl. No.: 09/637,545

(22) Filed: Aug. 11, 2000

(51) Int. Cl.⁷ .............................. G09G 5/02; G06K 9/00; G06K 9/34
(52) U.S. Cl. ...................... 345/593; 345/597; 382/162; 382/164; 382/165
(58) Field of Search .................... 345/418, 589–591, 345/593, 597, 604; 382/162–167, 154, 277, 2.1; 358/518, 520, 524, 523, 519, 529, 515, 517; 348/675

(56) References Cited

U.S. PATENT DOCUMENTS

| 1,630,247 A | 5/1927 | Adler | |
| 1,762,036 A | 6/1930 | Steedle | |
| 1,958,192 A | 5/1934 | Fletcher et al. | 41/6 |
| 2,203,167 A | 6/1940 | Lodwick | 41/6 |
| 2,512,181 A | 6/1950 | Spears | 35/28.3 |
| 2,636,286 A | 4/1953 | Bowman | 35/28.3 |
| 2,858,624 A | 11/1958 | Bowman | 35/28.3 |
| 2,938,281 A | 5/1960 | Miller | 35/28.3 |
| 3,120,065 A | 2/1964 | Gaudier-Pons | 35/28.3 |
| 4,199,877 A | 4/1980 | Akiyama | 35/28.3 |
| 4,665,394 A | 5/1987 | Coles et al. | 340/815.1 |
| 5,033,963 A | 7/1991 | Bourges | 434/98 |
| 5,311,212 A | 5/1994 | Beretta | 345/150 |
| 5,311,293 A | 5/1994 | MacFarlane et al. | 356/421 |
| 5,473,738 A | * 12/1995 | Hamlin | 345/582 |
| 5,615,320 A | 3/1997 | Lavendel | 395/131 |
| 5,803,739 A | * 9/1998 | Hitchcock | 434/78 |
| 5,909,220 A | * 6/1999 | Sandow | 345/582 |
| 5,923,885 A | 7/1999 | Johnson et al. | 395/712 |
| 6,029,141 A | 2/2000 | Bezos et al. | 705/27 |
| 6,081,253 A | * 6/2000 | Luke | 345/589 |
| 6,116,656 A | 9/2000 | Glassman | |
| 6,292,901 B1 | * 9/2001 | Lys | 713/300 |

OTHER PUBLICATIONS

Hideaki Chijiwa "Color Harmony, A Guide to Creative Color Combinations" ISBN 0–935603–9, 144 pages.*
N. Jacobson, & W. Bender "Color as determined communication" IBM systems journal, vol. 35, Nos. 3 & 4, 1996, pp. 526–538.*

* cited by examiner

Primary Examiner—Matthew C. Bella
Assistant Examiner—Wesner Sajous
(74) Attorney, Agent, or Firm—Troutman Sanders LLP; Wm. Brook Lafferty, Esq.

(57) ABSTRACT

A device and method for harmonizing color. The color harmonizing device of the present invention includes a plurality of color representations defined as base colors. Each base color is associated with a complementary color representation, a pair of split complementary color representations, and a pair of triadic match color representations. The complementary color representation, each split complementary color representation, and each triadic match color representation are associated with a quality such as a personality trait or mood. Each color representation, including the base color, is divided into a spectrum of colors based upon hue. Each color of the spectrum of the base color may be matched with the colors in the spectrums of the complementary color representation, the pair of split complementary color representations, and the pair of triadic match color representations based upon a desire for one of the qualities.

17 Claims, 4 Drawing Sheets

COLOR HARMONIZING DEVICE AND METHOD FOR USING THE SAME

TECHNICAL FIELD

The present invention relates to harmonizing colors and, more an particularly, relates to coordinating specific colors from a broader range of color combinations.

RELATED APPLICATION

The following patent application for related subject matter, "COLOR PREFERENCE SELF-HELP SYSTEM" (Attorney Docket No. 4165.107811), incorporated herein by reference, has been filed concurrently with the present application by the inventor of the present application.

BACKGROUND OF THE INVENTION

We are often unsure whether a particular combination of colors is a success. In fact, we often rely upon our friends who may also be unsure whether the color combination works or may even be unwilling to be honest whether the colors match. Other means of determining the compatibility are often just as unreliable.

There are, however, some devices available for coordinating colors. Unfortunately, the bleeding nature of color makes it almost impossible to match colors from any of the extensive color charts that currently exist. Additionally, these known devices are limited in the number of available color combinations that may identify matches. Finally, these known devices fail to explain the ambiance achieved from the use of a particular color combination.

Consequently, there is a need for an improved color harmonizing system to stimulate one's life style. This new device and method must create an increased number of orchestrated color combinations through a nonbleeding representation while providing a meaningful description of the personality or mood achieved with each color.

SUMMARY OF THE INVENTION

The present invention solves the above-identified problems by providing an improved color harmonizing system and device. One can use such a system and device in conjunction with decorating, advertising, cosmetics, selecting apparel and paint colors, and any other products that involve color. The harmonizing system of the present invention increases the number of color combinations to choose from, eases the manner of selecting such colors, creates more colorful and vibrant color combinations and provides one the opportunity to tailor needs to a particular quality such as a personality trait or mood.

Generally described, the device of the present invention includes a plurality of color representations defined as base colors. Each base color is associated with a complementary color representation, a pair of split complementary color representations, and a pair of triadic match color representations. Each of the color representations associated with the base color are also associated with a quality or mood. Each color representation, including the base color, is divided into a spectrum of colors based upon hue. Each color of the base color spectrum may be matched with the colors of the spectrums of the complementary color representation, the split complementary color representations, and the triadic match color representations based upon a desire for one of the qualities or moods.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

Similar reference characters refer to similar parts throughout the several views of the drawings.

DETAILED DESCRIPTION

The present invention permits the identification of a matching pair of colors with an understanding of the ambiance achieved with the use of the selected color combination. Although the present invention may be utilized in a variety of applications, the operation of the present invention will be demonstrated by describing specific embodiments. One embodiment of the present invention is a book. Other exemplary embodiments of the present invention can exist on a computer-readable medium for use on a computer or on a web page for use on the Internet.

Figure 1:
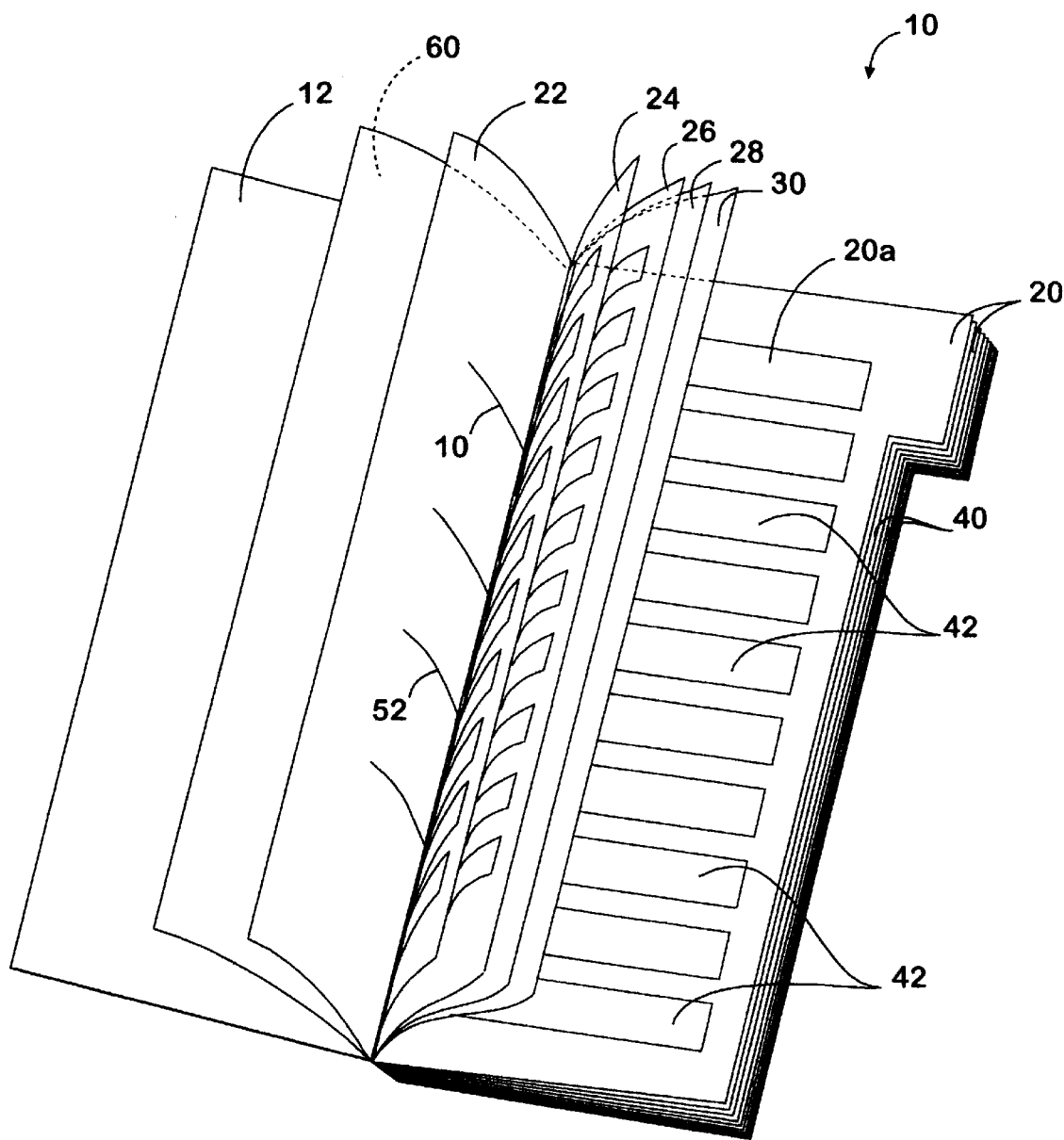
FIG. 1 illustrates a perspective view of an exemplary embodiment of the device of present invention incorporating the method of the present invention.

With reference to the drawings, a book for identifying combinations of matching colors, with a description of the qualities achieved with the use of particular color combinations, embodying the principles and concepts of the present invention and generally designated by the reference number 10, will be described. As shown in FIG. 1, the book 10 includes a plurality of pages for illustrating a plurality of color representations and associated text. The color representations include a plurality of base color representations. Each base color representation then includes a group of associated color representations described in greater detail below. The preferred base color representations are identified as follows: lime green, green, teal, blue, indigo, purple, magenta, red, red-orange, orange, gold and yellow. These base colors are derived from the three primary colors: red, blue and yellow.

A known color theory generally provides a circular presentation of the visual color spectrum where visually complimentary pairs of colors are diametrically opposite. The base colors are the basic hues in this color spectrum and, in between each pair of base colors, is a group of related colors. The colors in the circle are equally dispersed from one another based upon hue to produce the broadest range of colors possible.

The group of colors associated with each of the base color representations in this embodiment include a complementary color representation. The complimentary color is directly opposite to a base color in the circular presentation of hues under known color theory. The group of colors associated with a base color also includes a pair of split complementary color representations and a pair of triadic match color representations. The split complementary color representations are the colors located adjacent to any given complimentary color and the triadic matches are derived from a triangular array of colors spaced evenly from both the base color and each other around the circular color spectrum. For example, the base color gold has indigo as a complimentary color, blue and purple as split compliments, and magenta and teal as triadic matches.

Those skilled in the art understand that slight variations in color often exist from time to time. Often these variations in color result in the printing or fabrication of the color. Consequently, as a result of these variations in color, the colors identified in the present invention-are not exact and may be varied slightly. Therefore, colors are commonly referred to as color representations to indicate some variation in the color is permissible in the present invention.

As shown in FIG. 1, the book 10 includes a cover 12 with a plurality of pages therebetween. The book is configured to permit a user to flip between pages. At least some of the pages include the color representations as described above. Preferably, groups of pages are sized differently to distinguish them from other groups of pages in the book 10. For example, one group of pages may have a smaller width than the remaining pages in the book 10 as explained below.

In FIG. 1, one group of pages, having the reference numeral 20, illustrates the base color representations. Preferably, one page of group 20 corresponds with one of the base color representations. At least some of the other groups of pages illustrate the other colors in the group of colors. As best shown in FIG. 1, page 22 of book 10 illustrates the complimentary color representation, pages 24 and 26 illustrates the split compliment color representations, and pages 28 and 30 illustrate the triadic match color representations. Preferably, pages 22, 24, 26, 28 and 30 are adjacent or in the immediate proximity to the page which illustrates one of the base colors.

In one exemplary embodiment, pages having reference numeral 40 identify pages with one or more of a plurality of first qualities or moods as shown in FIG. 1. These qualities assist the user in selecting colors. Preferably, the qualities are provided in the form of text, illustration or other method suitable for conveying qualities. The first plurality of qualities correspond with one of the color representations from the associated group of colors. In other words, by selecting one of the qualities, the user is able to identify one of the colors from the group of colors. By selecting the identified color based upon the desired quality, the user is able to coordinate a color match with the previously selected base color and develop an ambiance suitable to one's desires.

Typically, each of the pages 40 are located in the proximity of the color representation being described. The quality associated with each color is primarily based upon commonly accepted principles. However, the qualities associated with a particular color may also be open to interpretation.

Figure 2:
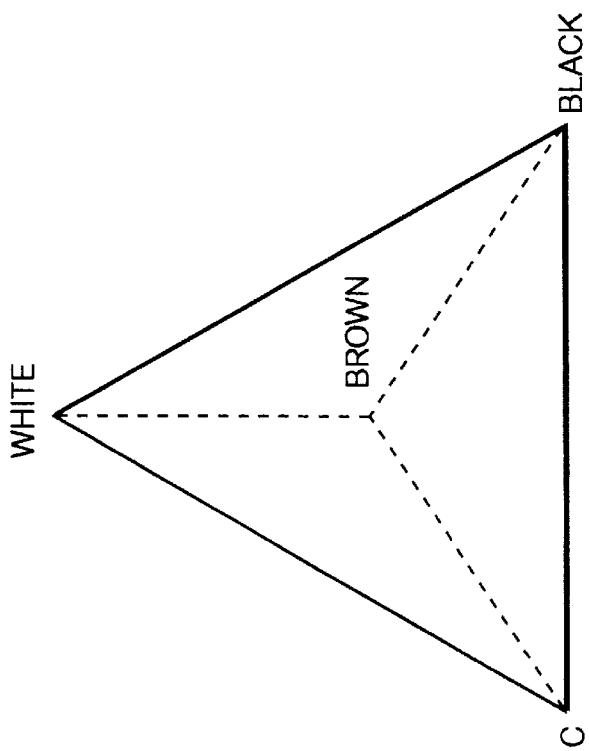
FIG. 2 illustrates a color tetrahedron created by adding varying amounts of Black, White and Brown to a color "C."

In another exemplary embodiment of the present invention, the base color representations and the color representations of the group of colors are each divided into a spectrum of colors. Each spectrum of colors may be shown graphically as shown in FIG. 2. FIG. 2 illustrates what is commonly referred to as a color tetrahedron. Preferably, each of these color representation is divided into twelve separate colors which are a predetermined hue distance apart from one another. All 12 spectrum colors can be plotted on a color tetrahedron. Each spectrum of color possesses a distinguishable blending of colors commonly referred to as a rainbow effect. To create at least a portion of each spectrum of color, each color representation "C" is expanded by adding varying amounts of either black, brown or white. For example, if "C" were Red, adding increasing amounts of White first turns Red into Pink. Eventually, Red will turn into White. The more Brown that is added, the more maroon, and then Rust, the color Red will appear. Eventually, in this case, Red will become Brown. Finally, the more Black that is added, the darker Red becomes until it turns Black.

Preferably, subsequent colors in a spectrum could include 50% more of black, brown or white relative to the immediate preceding color of the spectrum to obtain a consistent hue distance to insure a clear separation. The combination of varying amounts of black, brown and white maximizes the number of color combinations available for a specific color selection. Additional portions of each spectrum may be created by adding black and white which are commonly referred to as achromatics or the neutral and vibrant tones. The achromatic tones are created by adding black, blown and white and the vibrant tones are created by adding only white.

Figure 3:
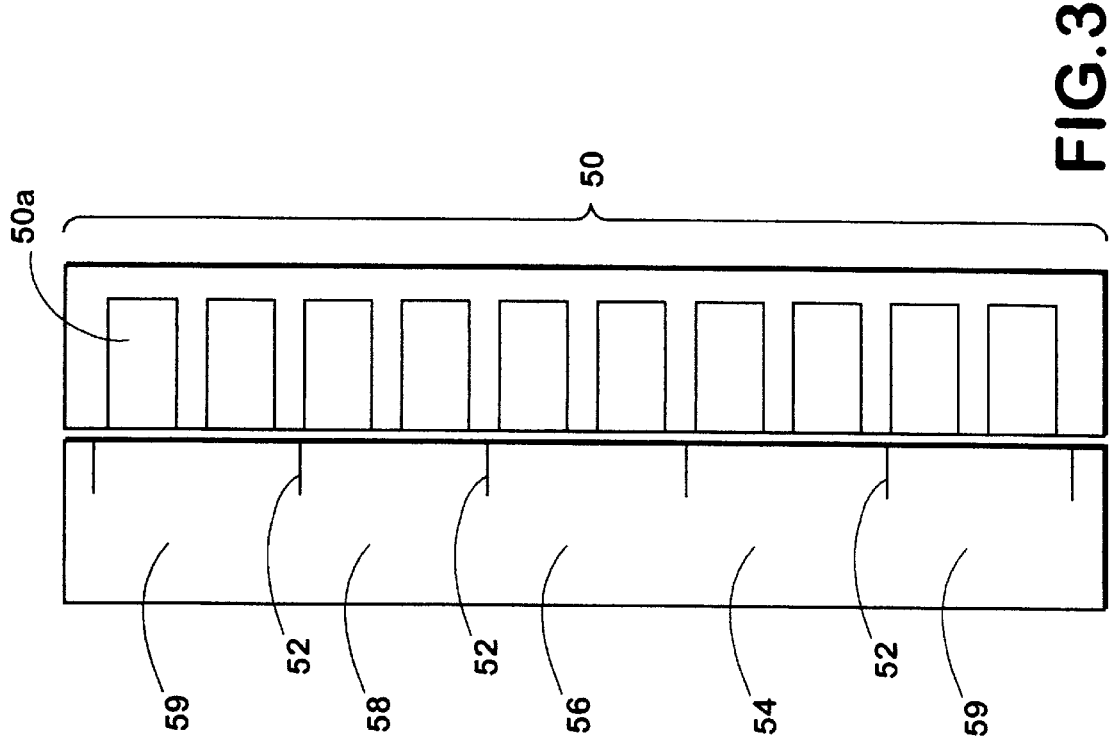
FIG. 3 illustrates a front view of an exemplary embodiment of a portion of the device of FIG. 1.

As best shown in FIG. 1, the spectrum of base color 20a includes the base color representation 20a itself and eleven additional color representations 42 derived from the base color 20a. In other words, the base color representation 20a is one of the twelve colors in its spectrum of colors. Preferably, the spectrums are arranged substantially in a vertical column. FIG. 3 best illustrates an exemplary spectrum 50 of one of the colors from the group of colors as it may appear on the front of page 22, 24, 26, 28 or 30. The color representation 50a is any of the colors from the group of colors associated with the base color 20a. The back of an adjacent page includes indicia 52 for identifying which colors of the spectrum include black, brown or white. The areas between the indicia 52, indicated by reference numerals 54, 56, and 58 are used for identifying the colors on the opposite facing page which contain black, brown or white, respectively. The achromatics are identified by the reference numeral 59. Note, however, that the spectrums derived from the colors in the group of colors are also arranged in substantially vertically columns, but their widths are substantially narrower relative to the width of the colors illustrated in the spectrum of the base color representation. The relative widths are best shown in FIG. 1. The narrower widths allow each of the pages illustrating the associated color representation to lay on top of the page illustrating the base color representation without blocking the entire view of any of the colors in the base color spectrum. Also note that the color representation on the top of each spectrum of colors is preferably the color representation from which the spectrum of colors was derived.

Still referring to FIG. 1, each base color representation corresponds with an associated page 60 for identifying a second plurality of qualities. Preferably, these qualities are aligned in a substantially vertical column in a manner to be positioned and correspond with one or more of the colors within the respective base color spectrum. For example, the front of page 60 shown in FIG. 1 includes the qualities associated with the colors within the spectrum of colors of base color 20a. When viewing the front of page 60, page 60 overlaps a portion of the page 20 having base color 20a. The qualities on page 60 may be also be categorized by indicia in a manner similarly described above. In such case, each of the qualities would correspond with at least one of the colors in the spectrum based upon which of the colors included black, brown or white.

Figure 4:
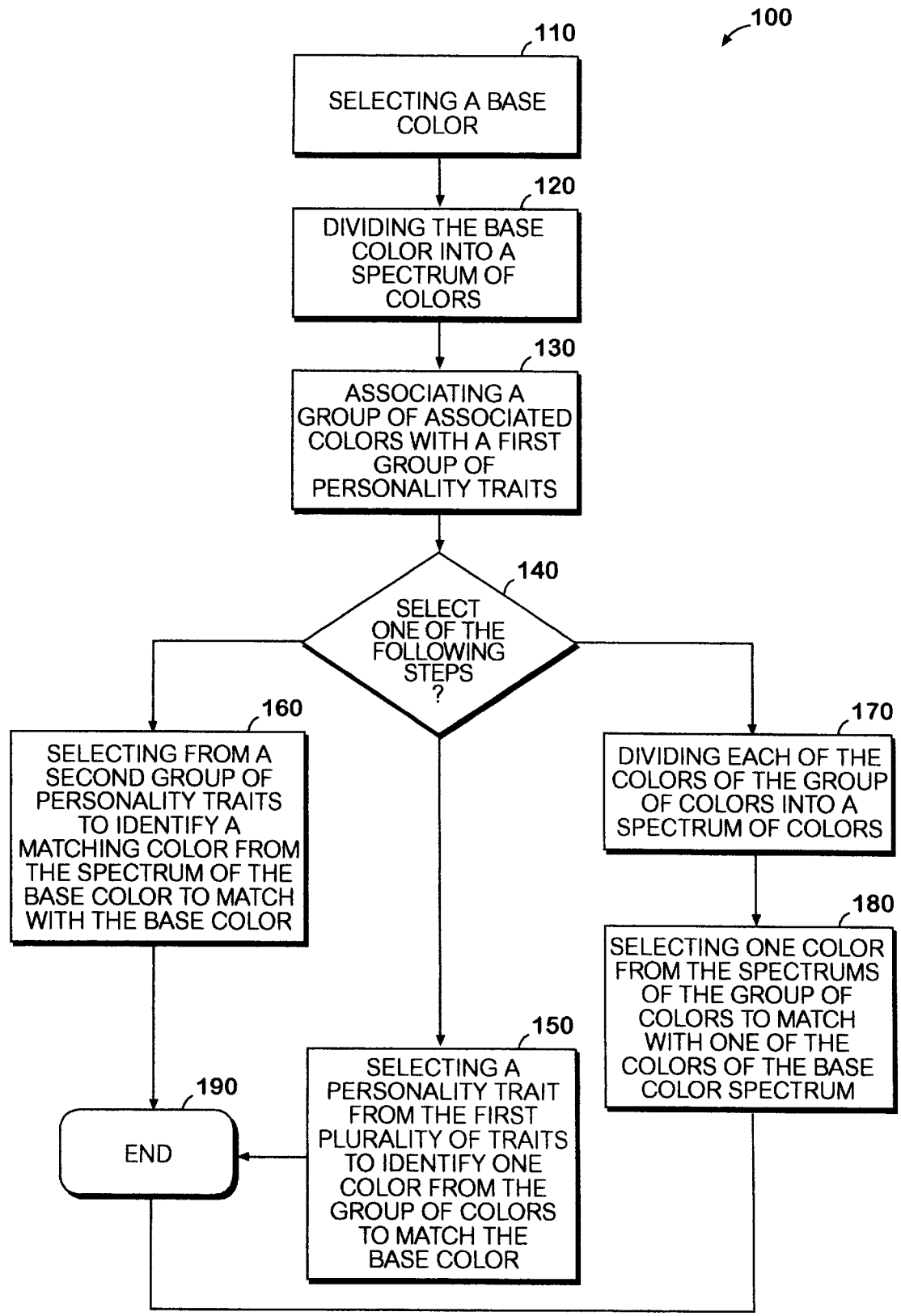
FIG. 4 illustrates an exemplary embodiment of a flowchart of the present invention.

FIG. 4 illustrates an exemplary embodiment of a flowchart of a method 100 of the present invention. The use of the device 10 as described above constitutes an inventive method of the present invention in addition to the device 10 itself. In practicing the method of determining color harmony with the device 10 as described above, the steps include selecting a base color from a plurality of base color representations and dividing the base color into a spectrum of colors as described above and as shown in process blocks 110 and 120. Process block 130 depicts the step of associating qualities with a group of colors associated with the selected base color representation. Next, as shown in decision block 140, the method 100 includes the step of selecting one of the following steps: a) selecting a desired quality corresponding with at least one of the colors from the group of colors to match with the previously selected base color as shown in block 150, b) selecting from a second group of qualities to identify a color from the base color spectrum as a matching color with the base color representation as shown in block 160, or c) dividing each of the colors in the group of colors into a spectrum and selecting a color from one of the spectrums of the group of colors to match with one of the colors from the base color spectrum as shown in blocks 170 and 180, respectively. In either case, a pair of corresponding colors is identified. The method 100 is terminated at block 190.

In an alternative embodiment, and the step in block 170 of dividing the colors in the group of colors into spectrums may instead be accomplished prior to the step in decision block 140. For example, the step in block 170 could occur concurrently with the step in block 120. In another alternative embodiment, the step shown in block 120 may be eliminated if the user decides in decision block 140 to select the step in block 150 over the steps in blocks 160 and 170.

An example of the method 100 may be described as follows. If a user selected the color blue from the plurality of base colors, the user may then read the qualities associated with each of the associated colors: the complimentary color, the pair of split complimentary colors and the pair of triadic matches which are orange, red-orange and gold, yellow and red, respectively. Alternatively, the user may selected a quality from a second set of qualities to match the base color with at least one other color from the base color's spectrum of colors. In another alternative, the user may select a color from one of the spectrums of the group of colors to match with one of the colors from the base color spectrum. The first two alternatives provide a matched pair of colors which is useful in assisting in the outward display of desired qualities. Either of the alternatives will provide a harmonious color pair.

In another exemplary embodiment, the present invention may be conveniently implemented in one or more program modules as well as hardware components. Instead of practicing the method 100 with the book 10, the method 100 may be stored on a computer-readable medium. On the computer-readable medium is stored one or more program modules of a computer program selecting colors and personalities. The computer program includes instructions which, when executed by a computer, perform the steps of method 100 as described above.

The present invention may conveniently be implemented in a program language such as "C"; however, no particular programming language has been indicated for carrying out the various tasks described because it is considered that the operation, steps, and procedures described in the specification and illustrated in the accompanying drawings are sufficiently disclosed to permit one of ordinary skill in the art to practice the instant invention. Moreover, in view of the many different types of computers, computer platforms and program modules that can be used to practice the present invention, it is not practical to provide a representative example of a computer program that would be applicable to this system. Each user of a particular platform would be aware of the language and tools which are more useful for that user's needs and purposes to implement the instant invention.

In one exemplary embodiment, the present invention includes a computer generally consisting of a processing unit which interfaces to a memory storage device, a display device and a user input device. The displace device may be of the kind suitable for allowing the user to touch the screen to select colors. An interface device may support at least one access line connecting the computer to the Internet. The access line may consist of analog or digital interfaces, and supports the process of transmitting and receiving analog or digital data in real-time or otherwise.

The memory storage device is operative to store a program module for implementing the present invention. For example, the present invention implemented as a computer program running on the computer, provides an interface to a user via the display device. The processing unit is responsive to instructions of the program module. In general, the program module can also transport data over the access line into the interface device. Periodic updates are used to provide current information and to maintain system integrity. Update frequency is determined based on system demands.

Figure 5:
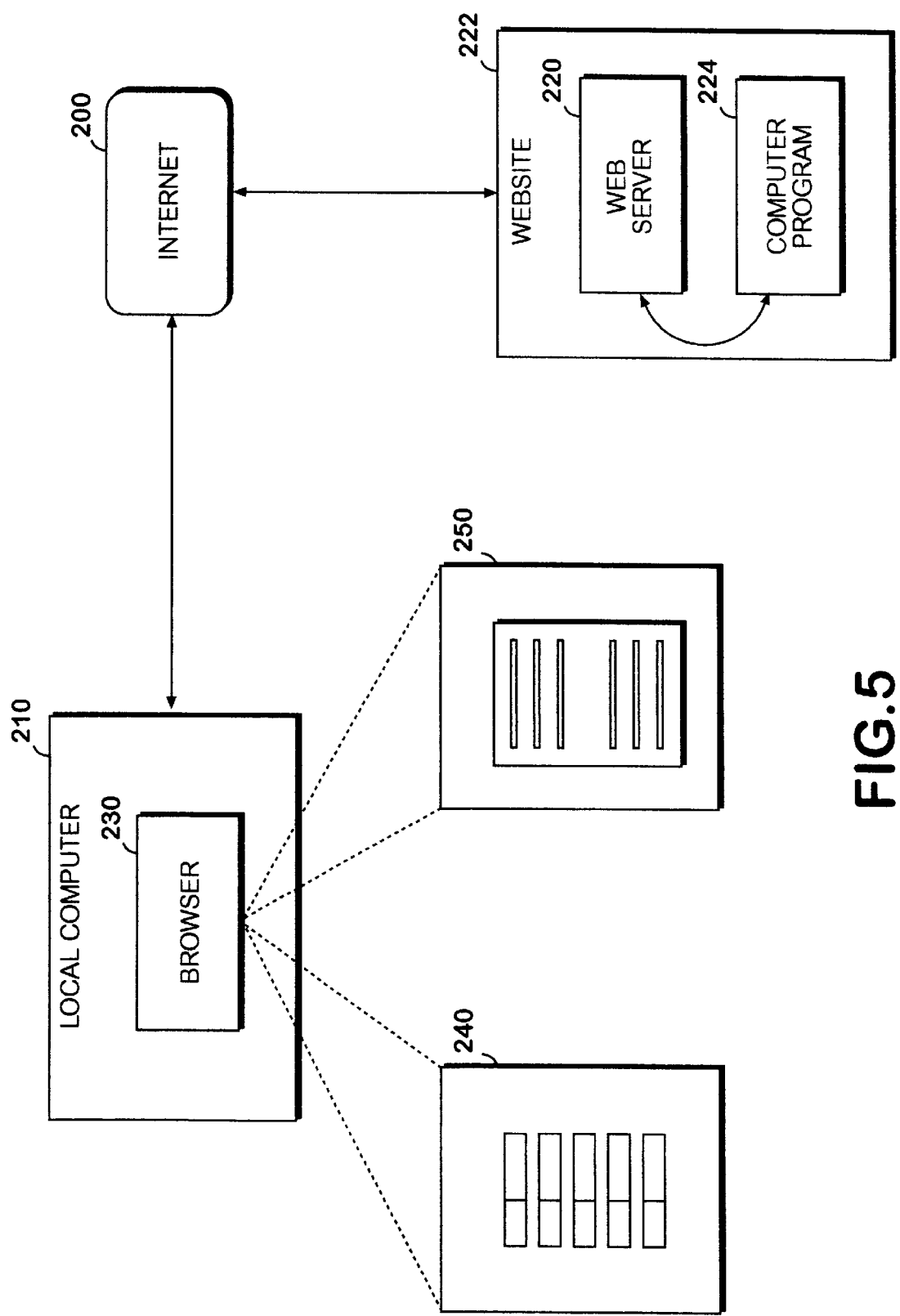
FIG. 5 illustrates an exemplary embodiment of the present invention operating within the environment of the Internet on a web site.

The method of the present invention may also be implemented as a web-based application as shown in FIG. 5. In this exemplary embodiment, the present invention may be maintained on a network such as the World Wide Web and is invoked by accessing the Internet 200 using a local computer 210 and an existing Internet Service Provider to contact a server 220 or series of servers for accessing a web site 222. The server 220 initiates a computer program 224 to conduct processing steps. The local computer 210 and the server 220 communicate via the Internet's File Transfer Protocol, commonly referred to as FTP. Alternatively, other technologies such as the HTTP protocol of the Web can be used for uploading and downloading files. The server 220 locates and sends the information for practicing the present invention to a web browser 230, which displays web pages having the requested information on the local computer. As shown in FIG. 5, web page 240 illustrates a base color spectrum with one of the spectrums from an associated color from the group of colors and web page 250 includes the qualities in the form of text associated with the selected color or combination of colors displayed on web page 240. To view the files of the present invention, the user may utilize a helper application or a plug-in. The user configures the web browser to launch these helper applications or plug-ins which are then used for performing the various tasks described above.

Hyperlinks may serve to connect one document or portion of a document to another and even one web site to another. For example, one document with the color representations may be linked to another document with the corresponding, predicted human behaviors. Various organizational structures may be used to connect the selected combinations of color representations with the appropriate corresponding, predicted human behavior.

In another embodiment, users can download software from a network, such as the World Wide Web, to be installed on the local computer to practice the method 100 as described above. Internal computer networks commonly referred to as Intranets may also be used.

The present invention has been illustrated in relation to particular embodiments which are intended in all respects to be illustrative rather than restrictive. Those skilled in the art will recognize that the present invention is capable of many modifications and variations without departing from the scope of the invention. Accordingly, the scope of the present invention is described by the claims appended hereto and supported by the foregoing.

What is claimed is:

1. A device for determining color harmony comprising:
    a plurality of base color representations, each said base color associated with a group of color representations, each said color representation of said group of colors associated with a quality for oneself; and
    each said color representation of said group of colors and said base colors divided into a spectrum of colors, wherein said color of said spectrum of colors of said base color may be matched with any of said colors of said spectrum of colors of said group of colors based upon a desired one of said qualities for oneself, wherein said group of colors comprises a complementary color representation, a pair of split complementary color representations, and a pair of triadic match color representations, wherein said spectrums of colors of said complementary color representation, said pair of split complementary color representations, and said pair of triadic match color representations are each arranged along side said spectrum of colors of one of said base colors, and wherein said spectrums of colors of said complementary color representations, each said split complementary color representations, and each said triadic match color representations overlap one another.

2. The device of claim 1 wherein said vertical columns of said spectrums of colors of said complementary color representation, said pair of split complementary color representations, and said pair of triadic match color representations each have a width smaller than a width of said vertical column of said spectrum of colors of said one of said base colors.

3. The device of claim 1 wherein each said color representation is divided into said spectrums of color based upon variations in hue.

4. The device of claim 1 wherein the hue of each said color representation is determined by adding from a group of color representation consisting of black, white, and brown.

5. The device of claim 1 wherein each said spectrum of colors is arranged in a vertical column.

6. The device of claim 1 wherein each said color of said spectrum of colors of said base color is associated with a quality for oneself.

7. A method for determining color harmony, wherein said method is provided in a book, said method comprising the steps of:
    selecting a base color representation from a plurality of base color representations depicted in said book;
    selecting a first desired quality for oneself; and
    in response to said step of selecting a first desired quality for oneself, identifying a second color representation associated with said first desired quality for oneself, said second color representation from a group of color representations depicted in said book, wherein said group of colors comprises a complimentary color representation, a pair of split complimentary color representations, and a pair of triadic match color representations which are arranged in approximation to said selected base color representation.

8. The method of claim 7 wherein said step of identifying said second color representation comprises selecting said second color from said group of color representations comprising:
    a complementary color representation;
    a first split complementary color representation;
    a second split complementary color representation;
    a first triadic match color representation; and
    a second triadic match color representation.

9. The method of claim 7 further comprising the step of dividing each of said color representations into a spectrum of colors based upon hue.

10. The method of claim 9 wherein variations of hue are obtained by adding portions of color from a group of color representations consisting of black, white, and brown.

11. The method of claim 9 further comprising the step of selecting a second desired quality for oneself in order to select from said spectrums of color of said base color representation.

12. The method of claim 9 further comprising the step of selecting a second desired quality for oneself in order to select from said spectrum of colors of said group of color representation.

13. A method of harmonizing color, wherein said method is provided in a book, comprising the steps of:
    selecting a base color representation from a plurality of base color representations depicted in said book;
    dividing said base color representation into a spectrum of colors;
    associating a group of color representations depicted in said book with a first plurality of qualities for oneself, wherein said group of colors comprises a complimentary color representation, a pair of split complimentary color representations, and a pair of triadic match color representations which are arranged in approximation to said selected base color representation; and
    selecting one of the following steps:
        selecting a desired quality from said first plurality of qualities for oneself in order to match one color from said group of colors with one of said colors of said base color spectrum;
        selecting from a second plurality of qualities for oneself associated with said base color spectrum of colors to identify at least one of said colors of said base color spectrum to match with said base color representation; or
        dividing each said color of said group of colors into a spectrum of colors, and selecting one of said colors from one of said spectrums of said group of colors to match with one of said colors of said base color spectrum.

14. The method of claim 13 wherein said step of dividing said base colors and said group of colors into said spectrums of colors comprises dividing said base colors and said group of colors into said spectrums of colors based upon hue.

15. The method of claim 13 wherein said method is provided in a book.

16. The method of claim 13 further comprising the step of subjecting to interpretation the selections of said color representations.

17. A book for determining color harmony comprising:

a plurality of base color representations depicted on pages of said book, each said base color associated with a group of color representations also depicted on pages of said book, each said color representation of said group of colors associated with a quality for oneself; and each said color representation of said group of colors and said base colors divided into a spectrum of colors, wherein each said color of said spectrum of colors of said base color may be matched with any of said colors of said spectrum of colors of said group of colors based upon a desired one of said qualities for oneself, wherein each said group of colors comprises a complimentary color representation, a pair of split complimentary color representations, and a pair of triadic match color representations which are arranged in approximation to one of said base colors.

\* \* \* \* \*